United States Patent
Naito (10) Patent No.: US 10,230,868 B2
(45) Date of Patent: Mar. 12, 2019

(54) FACSIMILE APPARATUS, CONTROL METHOD THEREOF, AND STORAGE MEDIUM

(71) Applicant: CANON KABUSHIKI KAISHA, Tokyo (JP)

(72) Inventor: Yosui Naito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/643,866

(22) Filed: Jul. 7, 2017

(65) Prior Publication Data

US 2017/0310850 A1    Oct. 26, 2017

Related U.S. Application Data

(63) Continuation of application No. 14/255,006, filed on Apr. 17, 2014, now Pat. No. 9,723,172.

(30) Foreign Application Priority Data

May 16, 2013 (JP) ................................. 2013-104520

(51) Int. Cl.
*G06F 3/12* (2006.01)
*H04N 1/333* (2006.01)

(52) U.S. Cl.
CPC ..... *H04N 1/33323* (2013.01); *H04N 1/33376* (2013.01); *H04N 1/33392* (2013.01)

(58) Field of Classification Search
None
See application file for complete search history.

(56) References Cited

U.S. PATENT DOCUMENTS

| | | |
|---|---|---|
| RE40,699 E | 4/2009 | Yoshida |
| 2004/0001224 A1 | 1/2004 | Kajiwara |
| 2005/0243871 A1 | 11/2005 | Tanimoto |
| 2006/0274731 A1 | 12/2006 | Ito |
| 2012/0013937 A1 | 1/2012 | Ashmore et al. |
| 2014/0050101 A1 | 2/2014 | Ulybin |

(Continued)

FOREIGN PATENT DOCUMENTS

| | | |
|---|---|---|
| CN | 1483277 A | 3/2004 |
| CN | 1777225 A | 5/2006 |
| CN | 100396077 C | 6/2008 |

(Continued)

OTHER PUBLICATIONS

Office Action for correspoding Chinese Application No. 201410200617.8 dated Dec. 6, 2016.

(Continued)

*Primary Examiner* — Helen Zong
(74) *Attorney, Agent, or Firm* — Carter, Deluca, Farrell & Schmidt, LLP (57) ABSTRACT

According to this invention, in a reception end facsimile apparatus having a first communication mode for performing communication at a high speed and a second communication mode for performing communication at a low speed, it is determined based on an instruction from a transmission end facsimile apparatus whether to perform error correction during facsimile communication. Control is done not to perform communication in the first communication mode based on a fact that it is determined not to perform error correction during facsimile communication.

7 Claims, 8 Drawing Sheets

(56) References Cited

U.S. PATENT DOCUMENTS

2014/0092428 A1    4/2014  Kawabata

FOREIGN PATENT DOCUMENTS

| CN | 101448060 A | 6/2009 |
|---|---|---|
| JP | H09-037056 A | 2/1997 |
| JP | 2001-298551 A | 10/2001 |
| JP | 2006-339845 A | 12/2006 |
| JP | 2008-109638 A | 5/2008 |

OTHER PUBLICATIONS

Office Action for correspoding Japanese Application No. 2013-104520 dated Feb. 6, 2017.
Korean Office Action issued in corresponding application No. 10-2014-0055250 dated Feb. 19, 2016.

FACSIMILE APPARATUS, CONTROL METHOD THEREOF, AND STORAGE MEDIUM

CROSS REFERENCE TO RELATED APPLICATIONS

This application is a continuation of U.S. patent application Ser. No. 14/255,006, filed on Apr. 17, 2014, which claims the benefit of and priority to Japanese Patent Application No. 2013-104520, filed on May 16, 2013, the entire contents of each of which are hereby incorporated by reference herein in their entireties.

BACKGROUND OF THE INVENTION

Field of the Invention

The present invention relates to a facsimile apparatus, a control method thereof, and a storage medium.

Description of the Related Art

A method of performing facsimile (FAX) communication using an IP network has been established in recent years. In Internet facsimile (IP FAX) communication using an IP network, SIP (Session Initiation Protocol) is used as a call connection protocol, and T.38 protocol is used in data communication. In the IP FAX communication using T.38 as well, capability exchange is done by exchanging a DIS (Digital Identification Signal) and a DCS (Digital Command Signal) defined by T.30. A receiver sends the capability declaration of the receiver to a transmitter by a DIS. The transmitter selects a mode to be used for communication based on the DIS within the range of the capability of the transmitter, and notifies the receiver of the result by a DCS. A bit representing whether the receiver/transmitter is a device (IAFD: Internet Aware FAX Device) capable of high-speed communication by the network (NW) speed is defined in the DIS/DCS. The network speed here indicates a speed higher than the speed of G3 FAX communication. A device (for example, a gateway apparatus connected to a G3 FAX apparatus) that can execute facsimile communication via an IP network but supports only G3 FAX communication via an analog line is not applicable to the above-described device capable of high-speed communication. At the time of IP FAX communication, when the devices know that they have the IAFD mode by capability exchange using the DIS/DCS, the communication is performed at the network speed by a DCS while neglecting the selected speed value. Since communication is done via the IP network, as described above, communication at a high speed as compared to conventional G3 FAX can be performed.

On the other hand, the T.38 protocol also defines ECM (Error Correction Mode) communication capable of correcting errors in image data that has failed in reception and Non-ECM communication that omits an intermediate procedure by prohibiting recovery (error correction), like G3 FAX. In ECM communication, image data is divided into HDLC (High-level Data Link Control procedure) frames, and a block including 256 frames at maximum is transmitted. When all frames are normally received, and preparation for reception of the next block is completed, the receiver returns an MCF (Message Confirmation) response. In ECM communication, the size of one block is predetermined to about 64 KB at maximum. If the MCF response cannot be returned immediately, flow control of 1 min is allowed by a T5 timer. That is, a delay of 1 min can be added to the time limit for the MCF response. Hence, ECM communication does not suffer an error caused by a late MCF response.

In Non-ECM communication, however, the image transmission unit is not a block but a page. Additionally, flow control of 1 min as in ECM communication is not defined as a protocol. For these reasons, it may be impossible to return the MCF response (impossible to return the response in time). As a conventional technique related to time adjustment for enabling a receiver to return the MCF response within a prescribed time in Non-ECM communication, Japanese Patent Laid-Open No. 2001-298551 discloses a technique related to minimum transmission time setting of FAX communication defined by ITU-T T.4 recommendation.

However, the conventional technique has a problem to be described below. For example, T.30 recommendation defines that a transmitter must set the minimum transmission time of DCS to 0 ms in communication between IAFDs. This aims at avoiding a case where a given fill as a bit string of 0 is inserted to the end of small line data in accordance with the NW speed, and an enormous quantity of dummy data is sent to the IP network. Hence, in communication between IAFDs, time adjustment by the minimum transmission time as in G3 FAX cannot be used. In Non-ECM communication between IP FAX apparatuses, the problem that the MCF response cannot be returned within the prescribed time remains unsolved. On the other hand, if IAFD declaration is always prohibited to avoid this problem, the speed of ECM communication also undesirably lowers.

SUMMARY OF THE INVENTION

The present invention enables realization of a mechanism that enables return of an MCF response within a prescribed time even at the time of Non-ECM reception of IP FAX.

One aspect of the present invention provides a reception end facsimile apparatus having a first communication mode for performing communication at a high speed and a second communication mode for performing communication at a low speed, comprising: a determination unit configured to determine based on an instruction from a transmission end facsimile apparatus whether to perform error correction during facsimile communication; and a control unit configured to control not to perform communication in the first communication mode based on a fact that the determination unit determines not to perform error correction during facsimile communication.

Another aspect of the present invention provides a reception end facsimile apparatus having a first communication mode for performing communication at a high speed and a second communication mode for performing communication at a low speed, comprising: a determination unit configured to determine whether to perform communication in the first communication mode; and a control unit configured to control to perform error correction during facsimile communication based on a fact that the determination unit determines to perform communication in the first communication mode.

Still another aspect of the present invention provides a control method of a reception end facsimile apparatus having a first communication mode for performing communication at a high speed and a second communication mode for performing communication at a low speed, comprising: determining, based on an instruction from a transmission end facsimile apparatus, whether to perform error correction during facsimile communication; and controlling not to perform communication in the first communication mode based on a fact that it is determined in the determining not to perform error correction during facsimile communication.

Yet still another aspect of the present invention provides a control method of a reception end facsimile apparatus having a first communication mode for performing communication at a high speed and a second communication mode for performing communication at a low speed, comprising: determining whether to perform communication in the first communication mode; and controlling to perform error correction during facsimile communication based on a fact that it is determined in the determining to perform communication in the first communication mode.

Still Yet another aspect of the present invention provides a non-transitory computer-readable storage medium storing a computer program that causes a computer to execute each step of a control method of the facsimile apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Arrangement of Facsimile Apparatus>

The first embodiment of the present invention will now be described with reference to the accompanying drawings. The hardware arrangement of an IP FAX apparatus (facsimile apparatus) complying with T.30 and T.38 having the functions of the embodiment and connection of a communication network will be described first with reference to FIG. 1.

Figure 1:
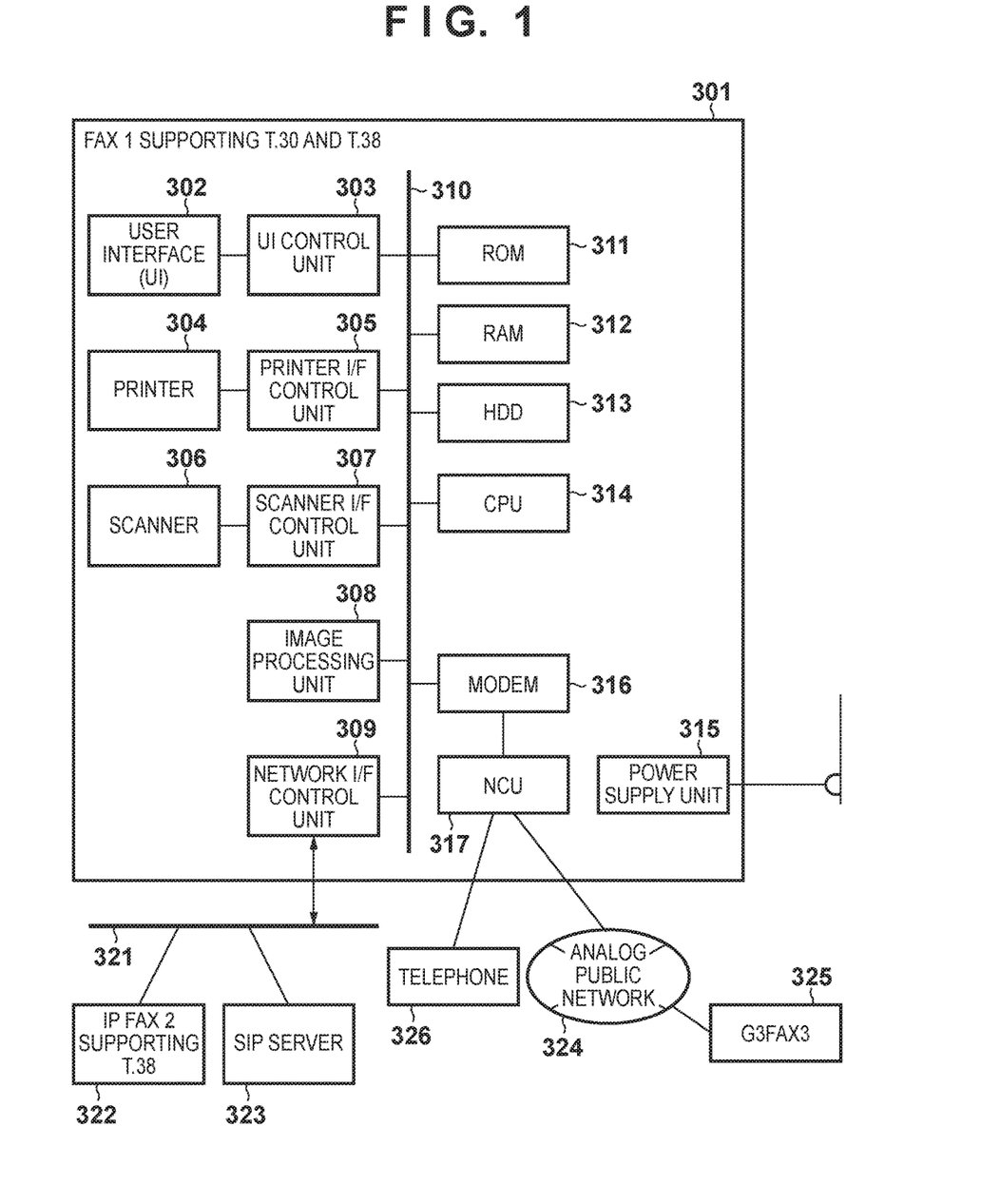
FIG. 1 is a block diagram showing an IP FAX apparatus and a network configuration.

Reference numeral 301 denotes a FAX apparatus 1 that complies with T.30 and T.38 having the functions of the present invention and supports G3 FAX (facsimile communication using an analog telephone line) and IP FAX (Internet facsimile communication using an IP network). The FAX apparatus 301 is connected to an analog public network 324 and a private IP network 321. Note that the connected IP network is not limited to the private IP network but may be a public IP network. Reference numeral 325 denotes an analog G3 FAX apparatus 3 complying with T.30. The FAX apparatus 301 can perform FAX communication with the G3 FAX 325 via the analog public network 324. Reference numeral 323 denotes a SIP server; and 322, an IP FAX apparatus 2 complying with T.38. The FAX apparatus 301 can communicate with the IP FAX apparatus 322 via the SIP server 323 and the private IP network 321.

The FAX apparatus 301 has an image input/output function and performs input of a paper document and print output to paper. The FAX apparatus 301 can print input image information on paper, store it as digital data, or transfer it to another apparatus via the private IP network or FAX. In general, the FAX apparatus 301 is always connected to the private IP network 321 and operated together with another image processing apparatus, PC (Personal Computer), or server. The FAX apparatus 301 can also receive print data from a PC or image information from another terminal and print it on paper.

The internal arrangement of the FAX apparatus 301 will be described next. The user can input an instruction for the operation of the FAX apparatus 301 from a user interface (UI) 302. The FAX apparatus 301 is connected to a commercial power supply and operated by supplying power via a power supply unit 315 into it. A bus 310 can connect a scanner I/F control unit 307, a CPU 314, a ROM 311, a RAM 312, an HDD 313, a printer I/F control unit 305, a UI control unit 303, an image processing unit 308, a network I/F control unit 309, and a MODEM 316 by electrical signals and transmit data. The bus 310 is used as a system bus configured to transmit/receive control signals from the CPU 314 and data signals between the units.

The CPU 314 reads out the control software program of the FAX apparatus 301 from the ROM 311 or the HDD 313 and expands and executes it on the RAM 312, thereby controlling the overall apparatus. The ROM 311 is a read only memory and stores the boot program, fixed parameters, and the like of the apparatus. A flash memory is often used as the ROM 311. The RAM 312 has the functions of a random access memory. A semiconductor memory is connected to it. When the CPU 314 controls the FAX apparatus 301, the RAM 312 is also used to, for example, store temporary operation data, image data, or print data. The HDD 313 is a hard disk drive and is used to store various kinds of data such as image data, print data, and destination registration information. The RAM 312 and the HDD 313 are also used by the CPU 314 as a work area to perform image data processing, encoding/decoding, or resolution conversion.

The image processing unit 308 performs image processing of attaining high-quality image data, resolution conversion, and encoding/decoding by hardware. The RAM 312 and the HDD 313 are also used by the CPU 314 as a work area to encode/decode data to be transmitted or perform an operation of processing IP packets. The UI control unit 303 controls the UI 302 and displays various kinds of information or accepts instruction input from the user.

The printer I/F control unit 305 is a device configured to control a printer 304. The scanner I/F control unit 307 is a device configured to control a scanner 306. The network I/F control unit 309 controls data transmission/reception to/from the private IP network 321 and analyzes or generates IP packets of TCP or UDP. Data transmitted or received by IP packet transmission/reception is temporarily stored in the RAM 312 or the HDD 313, and thereafter analyzed by the CPU 314 and processed in accordance with the protocol specification. The FAX apparatus 301 can perform call connection and data communication with a partner apparatus using a SIP session via the network I/F control unit 309 and the private IP network 321. The CPU 314 causes the network I/F control unit 309 to receive a T.38 packet from the private IP network 321 and analyzes it. The MODEM 316 demodulates a modulated signal from the telephone line or reversely modulates a signal from the apparatus and sends it to the telephone line. An NCU 317 corresponds to the interface portion between the telephone line and the FAX. The NCU 317 performs line control to detect a signal transmitted from the telephone line and transfer it to the MODEM 316, or switch the telephone line to the FAX or a telephone 326.

A data flow when the FAX apparatus 301 performs FAX communication by T.38 will be described here. Assume that the correspondence between telephone numbers and connection destination URIs (Uniform Resource Identifiers) is registered in the SIP server 323 in advance. A URI is an indicator indicating a partner address on the IP network.

A case in which the FAX apparatus 301 performs IP FAX communication with the IP FAX apparatus 322 will be described first. The CPU 314 operates the scanner 306 via the scanner I/F control unit 307, thereby reading a document and acquiring image data. When image data acquisition ends, the network I/F control unit 309 transmits a SIP connection request (INVITE signal) to the SIP server 323. The SIP server 323 receives the INVITE signal, searches for a corresponding URI based on a partner telephone number included in it, and transfers the INVITE signal to the coincident URI (in this case, IP FAX apparatus 322). When the INVITE signal is receivable, the IP FAX apparatus 322 transmits a 200 OK signal to the FAX apparatus 301 via the SIP server 323. In this way, the call is connected between the FAX apparatus 301 and the IP FAX apparatus 322. After that, the CPU 314 causes the image processing unit 308 to convert the scanned image data into encoded data such as JBIG. The network I/F control unit 309 converts the encoded data into a T.38 packet and transfers it to the IP FAX apparatus 322 via the private IP network 321. A T.38 packet sent from the IP FAX apparatus 322 reaches the network I/F control unit 309 via the private IP network 321, and encoded digital image data is extracted and sent to the CPU 314. The digital image data encoded by JBIG or the like is decoded into raw image data, sent to the printer I/F control unit 305 as received data, and printed by the printer 304.

<Communication by T.38 Protocol>

Figure 2:
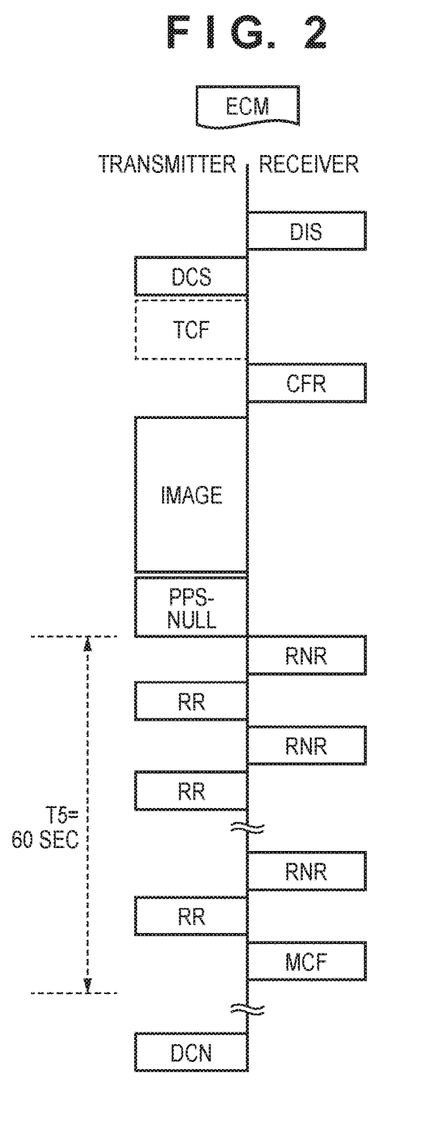
FIG. 2 is a view showing a protocol at the time of ECM communication.
Figure 3:
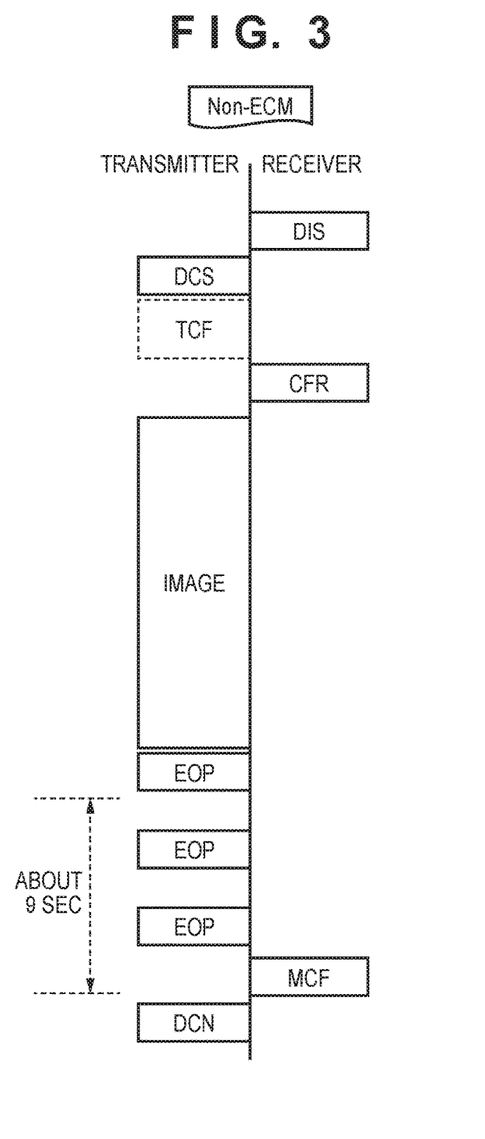
FIG. 3 is a view showing a protocol at the time of Non-ECM communication.

Two communication methods by the T.38 protocol will be described next with reference to FIGS. 2 and 3. FIG. 2 illustrates ECM (Error Correction Mode) communication capable of correcting errors in image data that has failed in reception. FIG. 3 illustrates Non-ECM communication that omits an intermediate procedure by prohibiting recovery (error correction).

In ECM communication shown in FIG. 2, image data is divided into HDLC (High-level Data Link Control procedure) frames, and a block including 256 frames at maximum is transmitted. Upon ending reception of one block and a procedure signal (PPS-Q signal) representing the end of the block, the receiver (reception end apparatus) confirms the numbers of the received frames. The PPS-Q signal is a generic name of PPS-EOP, PPS-MPS, and PPS-NULL. If an unreceived frame exists, the receiver returns a PPR (Partial Page Request) response as a retransmission request. When all frames are normally received, and preparation for reception of the next block is completed, the receiver returns an MCF (Message Confirmation) response.

To return the MCF response, that is, to complete preparation for reception, decoding processing and storage processing of the received data need to end. In some cases, decoding processing takes a time because of the performance of the receiver, and the MCF response cannot be returned immediately. Hence, in ECM communication, flow control of 1 min is allowed by a T5 timer. That is, a delay of 1 min can be added to the time limit for the MCF response.

If decoding processing cannot end in time, and the MCF response cannot be returned immediately, the receiver can temporarily return an RNR (Receive Not Ready) response to the PPS-Q signal. The transmitter (transmission end apparatus) receives it and transmits an RR (Receive Ready) signal to query the reception state again. In ECM communication, this RNR-RR exchange can be continued for 1 min at maximum. When preparation for reception is ended during this time, and the MCF response can be returned, no communication error takes place. Note that since the size of one block of ECM communication has a predetermined upper limit, about 64 KB, the MCF response can be returned almost reliably during the flow control of 1 min. Even when IP FAX apparatuses perform communication at a very high speed, ECM communication does not suffer an error caused by a late MCF response.

On the other hand, in Non-ECM communication shown in FIG. 3, the image transmission unit is not a block but a page. Hence, the data size of one page may be very large depending on the document size or resolution. In Non-ECM communication, however, flow control of 1 min as in ECM communication is not defined as a protocol. For these reasons, even if the size of a received image is large, and decoding processing cannot end in time, the receiver cannot return the RNR response. If the receiver cannot return the MCF response during the time the transmitter retransmits a Q signal representing the end of a page three times at maximum at an interval of 3 sec, a communication error takes place. That is, in Non-ECM communication, a delay of only about 9 sec is allowed until MCF return.

In G3 FAX, however, since the maximum speed of Non-ECM communication is 14.4 kbps, and at this speed, image data reception itself takes time, the receiver can advance decoding processing during this time as well. For this reason, in a recent G3 FAX apparatus, even when the above-described allowable delay is about 9 sec, the MCF response is rarely too late. In IP FAX, however, communication is done at a very high speed of several Mbps, and reception ends quickly even for a very large image. Hence, in some cases, the time usable by the receiver to do decoding processing is only about 9 sec, as described above. In an IP FAX apparatus that includes no hardware for decoding processing, it may be impossible to end the decoding processing during the time of about 9 sec and return the MCF response.

A technique related to time adjustment for enabling a receiver to return the MCF response within a prescribed time in Non-ECM communication is "minimum transmission time setting" defined by ITU-T T.4 recommendation. The minimum transmission time means a minimum time necessary for the receiver to process one line. Not to make the transmission time of one line shorter than the minimum transmission time, a bit string of 0 (fill) is added to the end of small line data on the transmitter side. This fill is dummy data for time adjustment and is removed from the image data on the receiver side. The transmitter notifies the receiver of the minimum transmission time by a DCS (transmission end information) so that it does not fall below the minimum transmission time declared by the receiver using a DIS (reception end information), and inserts a fill in image data. However, as described above, the T.30 recommendation defines that a transmitter must set the minimum transmission time of DCS to 0 ms in communication between IAFDs because if a fill is inserted in accordance with the NW speed (network speed), an enormous quantity of dummy data is sent to the IP network. Hence, in communication between IAFDs, time adjustment by the minimum transmission time as in G3 FAX cannot be used. The facsimile apparatus according to this embodiment provides a mechanism for always returning the MCF response within a prescribed time even at the time of Non-ECM reception in IP FAX.

<Processing Procedure>

A processing procedure according to this embodiment will be described next with reference to FIG. 4. A processing procedure of retransmitting a DIS at the time of IP FAX reception and that until transition to an image reception phase will be described here. That is, an example in which the FAX apparatus 301 operates as a receiver in IP FAX will be explained here. In the processing of this flowchart, the CPU 314 reads out the control software program of the FAX apparatus 301 from the ROM 311 or the HDD 313 and expands and executes it on the RAM 312. In DIS and CFR (Confirmation To Receive) transmission processes of steps S402, S406, and S407 of the flowchart, the CPU 314 causes the network I/F control unit 309 to generate a T.38 packet. The network I/F control unit 309 transmits the packet to the private IP network 321. In DCS reception processing of step S403, the network I/F control unit 309 receives a T.38 packet received from the private IP network 321, and the CPU 314 analyzes it. The CPU 314 acquires control signal information of DCS and stores it in the RAM 312, thereby executing the processing. These processes will simply be referred to as "transmit" and "receive" hereinafter for the sake of descriptive simplicity.

In step S401, the CPU 314 sets a flag indicating the IAFD mode (mode that enables high-speed communication at the NW speed) of the FAX apparatus 301 to ON and stores it in the RAM 312. In step S402, the CPU 314 transmits a DIS whose Bit 123 (flag indicating IP-FAX apparatus capability) representing IAFD mode ON is set to 1.

The bits of DIS/DCS will be described here. Whether a partner apparatus is in ECM or Non-ECM or is an IAFD or not is defined in a bit of DIS/DCS and can therefore be discriminated by checking it. A bit representing the ECM mode is assigned to the 27th bit, and a bit representing whether an apparatus is an IAFD is assigned to the 123rd bit.

Bit 27 0: Non-ECM, 1: ECM
Bit 123 0: not IAFD, 1: IAFD

In step S403, the CPU 314 receives a DCS sent from the partner apparatus. In step S404, the CPU 314 acquires the value of Bit 123 of the DCS received in step S403 and the value of a variable indicating the IAFD mode of the FAX apparatus 301, which is stored in the RAM 312, and determines whether both values represent IAFD mode ON. If at least one of the values represents IAFD mode OFF, the process advances to step S407 to transmit CFR. After that, the process transits to the image reception phase in step S408, and facsimile reception starts.

On the other hand, if both values represent IAFD mode ON in step S404, in step S405 the CPU 314 acquires the value of Bit 27 of the DCS and determines whether selection of the transmitter is ECM. If selection of the transmitter is ECM, the process advances to step S407 and then to step S408. The process transits to the image reception phase, and facsimile reception starts. Otherwise, the process advances to step S406, and the CPU 314 updates the flag indicating the IAFD mode of the FAX apparatus 301, which is stored in the RAM 312, to OFF. In addition, the CPU 314 generates a DIS whose Bit 123 is set to 0 to indicate IAFD mode OFF, and retransmits it. In this case, the transmission end apparatus re-receives the DIS.

After the retransmission, the process returns to step S403, and the CPU 314 receives a DCS. Once the IAFD mode of the FAX apparatus 301 is set to OFF in step S406, the determination of step S404 always ends with NO from the second time. Hence, the processing of changing the IAFD mode to OFF and retransmitting the DIS is performed only once. That is, an endless loop is not formed even if the DIS of IAFD mode OFF is transmitted in step S406, and nonetheless, the partner apparatus transmits the DCS of IAFD mode ON again.

As described above, according to this embodiment, at the time of IP FAX reception, the FAX apparatus 301 (receiver) first makes DIS declaration by a DIS to declare that the apparatus is an IAFD. Only when the transmitter notifies IAFD and Non-ECM by a DCS, the receiver redoes the DIS declaration to declare that the apparatus is not an IAFD. This allows the transmitter to switch the image transmission speed from the NW speed to the G3 FAX speed. Since the time necessary for image reception is thus prolonged and devoted to decoding processing, the MCF response can be returned within the prescribed time.

As for the DIS declaration of the receiver, normally, if the receiver is an IP FAX apparatus, the declaration is done by setting Bit 123 to 1 (the apparatus is an IAFD). If the receiver is a G3 FAX apparatus, the declaration is done by setting Bit 123 to 0 (the apparatus is not an IAFD). The transmitter that is an IAFD checks Bit 123 of the DIS of the receiver. If the bit is 1, the transmitter judges that the partner apparatus is an IAFD, sets Bit 123 of the DCS to 1, and performs transmission at a high speed. If the bit is 0, the transmitter judges that the partner apparatus is a G3 FAX apparatus connected to a GW, sets Bit 123 of the DCS to 0, and performs transmission at the G3 speed. Hence, even when the transmitter is an IAFD, the receiver declares again by the DIS that the apparatus is not an IAFD, thereby lowering the communication speed to the G3 speed.

Second Embodiment

The second embodiment of the present invention will be described below with reference to FIGS. 5 to 8. In this embodiment, control of deciding whether a FAX apparatus 301 is capable of ECM at the time of FAX transmission or FAX reception will be explained. An address book registration menu and a FAX transmission/reception setting menu which are displayed on an operation screen when transmitting data in this embodiment will be described first with reference to FIG. 5.

Figure 5:
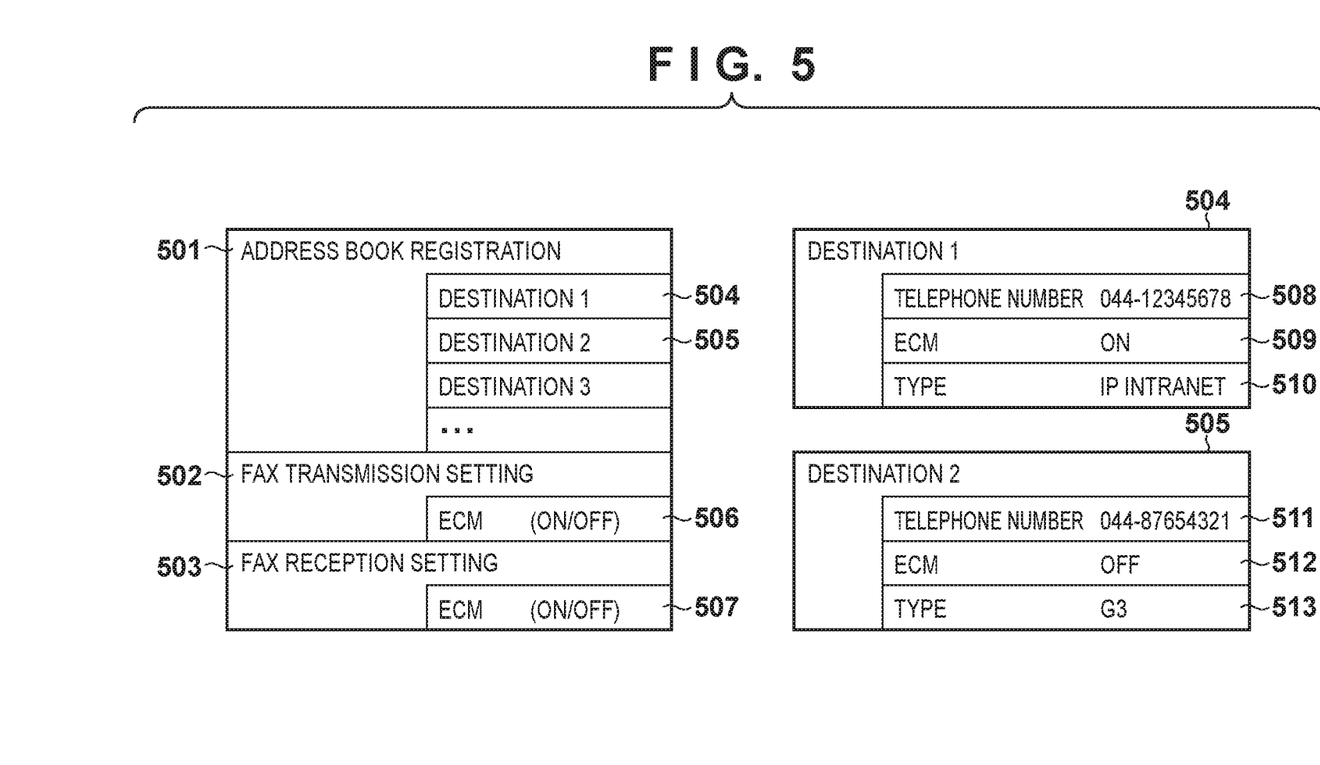
FIG. 5 is a view showing a registration menu/address book according to the second embodiment.

Reference numeral 501 denotes address book registration. In the address book registration, a plurality of destinations can be registered. The address book registration includes, for example, telephone numbers 508 and 511, ECM settings 509 and 512, and settings of types 510 and 513 used for distinction between IP FAX and G3 FAX for the respective destinations. Note that although an example in which registrable items other than those described above exist is also possible, it will be omitted here.

A destination 504 is an IP FAX destination as indicated by the type 510. The telephone number 508 is 044-12345678, and ON is registered as the ECM 509. A destination 505 is a G3 FAX destination as indicated by the type 513. The telephone number 511 is 044-87654321, and OFF is registered as the ECM 512.

When selecting a destination from the address book and performing FAX transmission, the type set for each destination is referred to, thereby discriminating whether the destination is an IP destination or G3 destination. In case of FAX transmission from the address book, the ECM setting 509 or 512 registered for each destination is referred to when deciding ECM selection at the time of transmission (to be described later).

Reference numeral 502 denotes a FAX transmission setting menu; and 506, transmission ECM setting registration of the main body. The transmission ECM setting registration 506 is used to decide ECM selection at the time of transmission (to be described later) when performing FAX transmission by a new destination that is not registered in the address book 501.

Reference numeral 503 denotes a FAX reception setting menu; and 507, reception ECM setting registration of the main body. The reception ECM setting registration 507 is used to decide ECM selection at the time of FAX reception (to be described later). Although an example in which items other than the ECM settings are also registrable is also possible in the FAX transmission setting 502 and the FAX reception setting 503, it will be omitted here.

Figure 6:
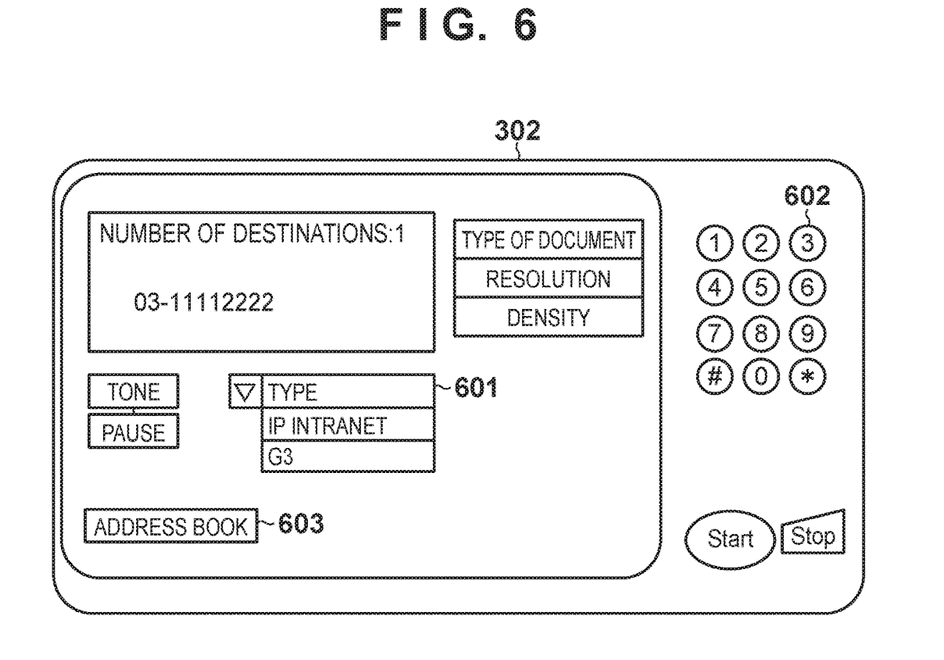
FIG. 6 is a view showing a UI screen according to the second embodiment.

A UI 302 according to this embodiment will be described next with reference to FIG. 6. Destination input at the time of FAX transmission and advanced settings such as a document read mode can be done from the UI 302. For a new destination that is not registered in the address book, the telephone number is input using a ten-key pad 602. For a new destination, IP FAX destination or G3 FAX destination is selected by a type selection button 601. When selecting a destination already registered in the address book, it can be selected by an address book button 603. Hence, when the address book button 603 is pressed, a list of already registered addresses is displayed.

<Processing Procedure>

Figure 7:
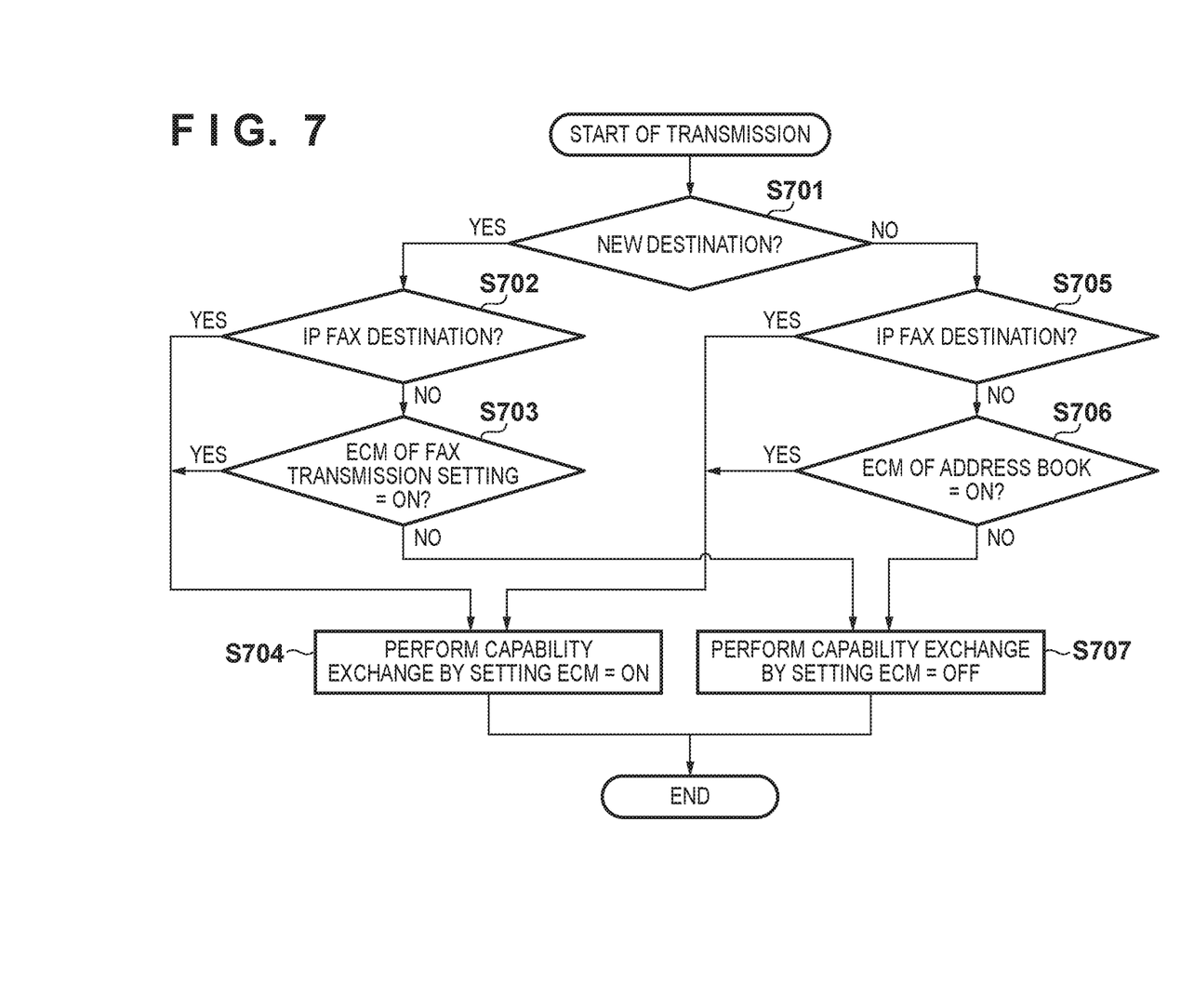
FIG. 7 is a flowchart showing an example at the time of transmission according to the second embodiment.
Figure 8:
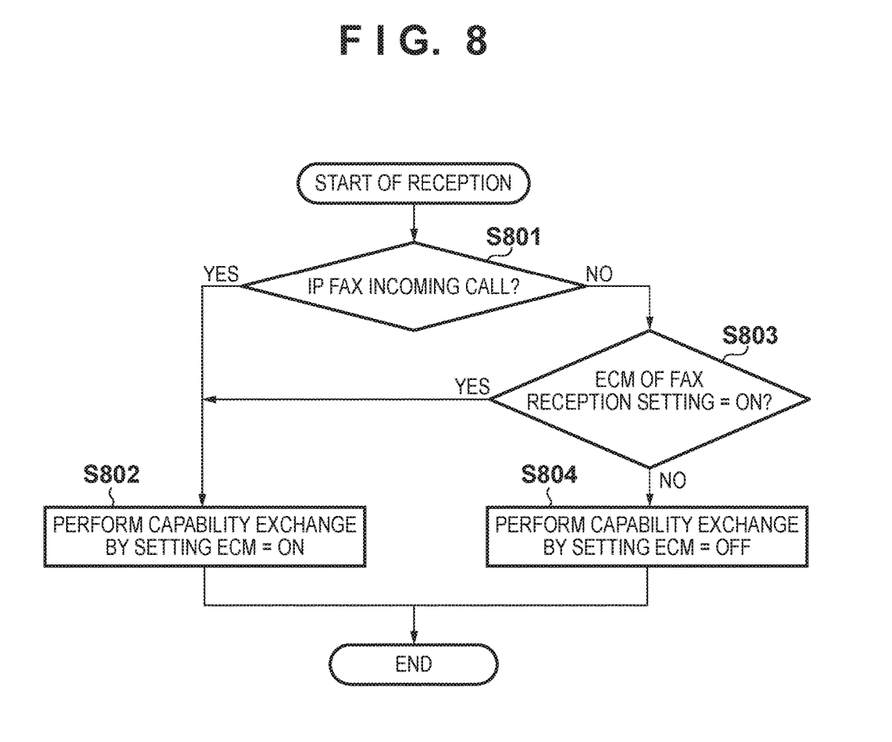
FIG. 8 is a flowchart showing an example at the time of reception according to the second embodiment.

A processing procedure, according to this embodiment, of deciding the ECM mode used for capability exchange at the time of FAX transmission and FAX reception will be described next with reference to FIGS. 7 and 8. Note that the ECM mode of FAX communication is eventually decided by capability exchange with the partner apparatus. A processing procedure of deciding whether the FAX apparatus 301 is capable of ECM at the time of capability exchange will be described here.

A deciding procedure at the time of FAX transmission will be explained first with reference to FIG. 7. In the processing of this flowchart, a CPU 314 reads out the control software program of the FAX apparatus 301 from a ROM 311 or an HDD 313 and expands and executes it on a RAM 312.

In step S701, a UI control unit 303 receives destination information input from the UI 302 by the user. The CPU 314 determines based on the destination information whether the destination is a new destination or a destination registered in the address book. If the destination is a new destination, the process advances to step S702. The CPU 314 refers to type information in the destination information and determines whether the destination is an IP FAX destination or a G3 FAX destination. Upon determining that the destination is an IP FAX destination, the process advances to step S704. The CPU 314 decides that ECM to be used for capability exchange is ON without reading out the ECM value 506 of the FAX transmission setting 502 stored in the RAM 312, and ends the processing.

On the other hand, upon determining in step S702 that the destination is a G3 FAX destination, the process advances to step S703. The CPU 314 reads out the ECM value 506 of the FAX transmission setting 502 stored in the RAM 312, and determines whether it is ON. If the value is ON, the process advances to step S704, and the CPU 314 decides that ECM to be used for capability exchange is also ON. If the value is OFF, the process advances to step S707. The CPU 314 decides that the value of ECM to be used for capability exchange is OFF, and ends the processing.

Upon determining in step S701 that the input destination is a destination already registered in the address book 501, the process advances to step S705. The CPU 314 reads out type information registered for each destination from the RAM 312, and determines whether the destination is an IP FAX destination or a G3 FAX destination. If the destination is an IP FAX destination, the process advances to step S704. The CPU 314 decides that ECM to be used for capability exchange is ON without reading out the ECM value 509 or 512 stored in the RAM 312 for each destination, and ends the processing.

On the other hand, if the destination is a G3 FAX destination, the process advances to step S706. The CPU 314 reads out the ECM value 509 or 512 stored in the RAM 312 for each destination, and determines whether it is ON. If the value is ON, the process advances to step S704, and the CPU 314 decides that the value of ECM to be used for capability exchange is also ON. If the value is OFF, the process advances to step S707, and the CPU 314 decides that the value of ECM to be used for capability exchange is OFF.

With the above-described processing, even when the transmission ECM 506 of the apparatus or the ECM 509 or 512 of the address book is set to OFF, the apparatus can always operate by setting ECM to ON at the time of IP FAX transmission. This can prevent Non-ECM communication that may suffer a communication error caused by a late MCF response from being performed due to the ECM setting of the FAX apparatus 301 (transmitter side) at the time of IP FAX communication.

A deciding procedure at the time of FAX reception will be explained next with reference to FIG. 8. In the processing of this flowchart, the CPU 314 reads out the control software program of the FAX apparatus 301 from the ROM 311 or the HDD 313 and expands and executes it on the RAM 312.

Assume that the apparatus receives a facsimile incoming call. In G3 FAX, an NCU 317 detects a call signal from an analog public network 324 and notifies the CPU 314 of the incoming call. In IP FAX, a network I/F control unit 309 detects INVITE signal reception from a private IP network 321 and notifies the CPU 314 of the incoming call. Upon detecting the incoming call, in step S801, the CPU 314 determines the notification source and determines whether it is IP FAX reception or G3 FAX reception.

For IP FAX reception, the process advances to step S802. The CPU 314 decides that ECM to be used for capability exchange is ON, and ends the processing. For G3 FAX reception, the process advances to step S803. The CPU 314 reads out the ECM value 507 of the FAX reception setting 503 stored in the RAM 312, and determines whether ECM setting is ON. If ECM is ON, the process advances to step S802. The CPU 314 decides that the value of ECM to be used for capability exchange is ON, and ends the processing. If the value is OFF, the process advances to step S804. The CPU 314 decides that the value of ECM to be used for capability exchange is OFF, and ends the processing.

With the above-described processing, even when the reception ECM 507 of the apparatus is set to OFF, the apparatus can always operate by setting ECM to ON at the time of IP FAX reception. This can prevent Non-ECM communication that may suffer a communication error caused by a late MCF response from being performed due to the ECM setting of the FAX apparatus 301 (receiver side) at the time of IP FAX communication.

As described above, according to this embodiment, even when the ECM setting of the FAX apparatus 301 is OFF, capability exchange is done by setting ECM=ON in IP FAX communication. In recent years, there exist many FAX apparatuses supporting both IP FAX and G3 FAX. In G3 FAX, when a steadily noisy line is connected, frame retransmission by PPR may frequently occur in ECM communication, and a long time may be needed to end the communication. For this reason, ECM of the apparatus is set to OFF in some cases. However, IP FAX communication is preferably used by setting ECM to ON because the above-described problem arises when ECM is set to OFF. Additionally, there is not much merit in setting ECM to OFF in IP FAX due to the following reason. That is, in the TCP environment, retransmission in case of packet loss or error correction is performed in the NW layer, and frames are never lost. In addition, even the UDP environment can hardly be considered as an environment where packet loss steadily takes place. Hence, in IP FAX, a case where ECM communication takes a long time to end due to frequent occurrence of PPR is hard to imagine. In capability exchange of FAX or IP FAX, when the FAX apparatus 301 declares Non-ECM, communication is performed by Non-ECM even if the partner apparatus has the ECM capability. To prevent this, in this embodiment, IP FAX communication is always performed by declaring ECM independently of ECM setting of the apparatus.

Third Embodiment

Figure 9:
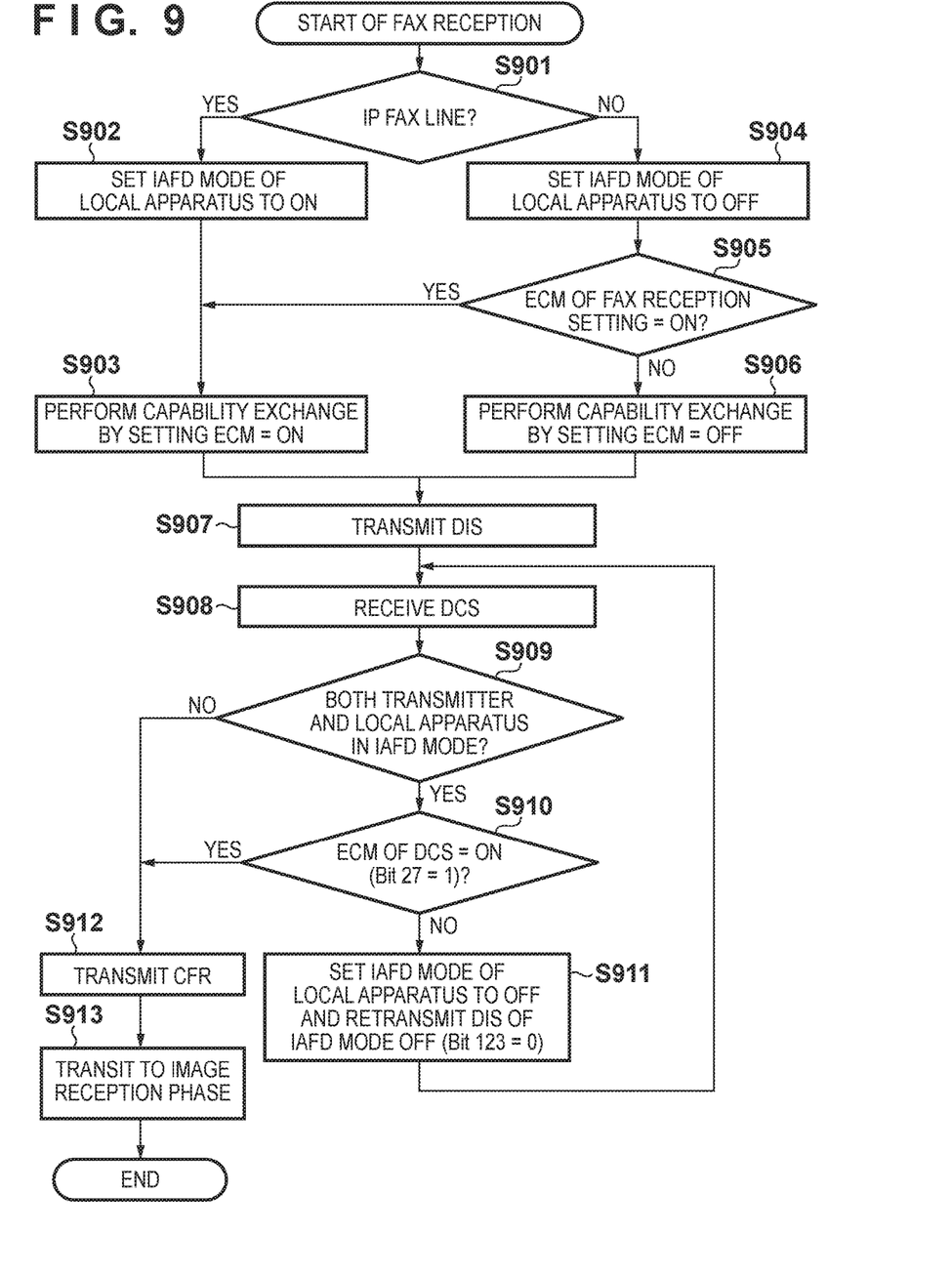
FIG. 9 is a flowchart showing a processing procedure according to the third embodiment.

The third embodiment of the present invention will be described below with reference to FIG. 9. In this embodiment, control that combines the first and second embodiments will be explained. FIG. 9 illustrates a processing procedure concerning decision of the ECM mode to be used for capability exchange at the time of facsimile incoming call and DIS retransmission. In the processing of this flowchart, a CPU 314 reads out the control software program of a FAX apparatus 301 from a ROM 311 or an HDD 313 and expands and executes it on a RAM 312. As for DIS and CFR transmission processes performed in steps S907, S911, and S912 of the flowchart and DCS reception processing performed in step S908, the execution method changes between IP FAX communication and G3 FAX communication, and the execution methods will be described in advance. Concerning DIS or CFR transmission processing, in IP FAX communication, the CPU 314 causes a network I/F control unit 309 to generate a T.38 packet of DIS or CFR. The network I/F control unit 309 transmits the packet to a private IP network 321. In G3 FAX, the CPU 314 modulates control signal data of DIS or CFR using a MODEM 316 and converts it into an analog FAX signal. The analog FAX signal is sent to an analog public network 324. Concerning DCS reception processing, in IP FAX, the network I/F control unit 309 receives a T.38 packet received from the private IP network 321. The CPU 314 analyzes the T.38 packet, extracts control signal information of DCS, and stores it in the RAM 312. In G3 FAX, the MODEM 316 demodulates an analog FAX signal received from the analog public network 324 and acquires the control signal information of DCS. The acquired DCS control signal is stored in the RAM 312. These processes will simply be referred to as "transmit" and "receive" hereinafter for the sake of descriptive simplicity.

Assume that the apparatus receives a facsimile incoming call. In G3 FAX, an NCU 317 detects a call signal from the analog public network 324 and notifies the CPU 314 of the incoming call. In IP FAX, the network I/F control unit 309 detects INVITE signal reception from the private IP network 321 and notifies the CPU 314 of the incoming call. Upon detecting the incoming call, in step S901, the CPU 314 discriminates the notification source and determines whether it is IP FAX reception or G3 FAX reception. For IP FAX reception, in step S902, the CPU 314 sets a flag indicating the IAFD mode of the FAX apparatus 301 to ON and stores it in the RAM 312. Subsequently, in step S903, the CPU 314 decides that ECM to be used for capability exchange is ON.

On the other hand, upon determining in step S901 that it is G3 FAX reception, in step S904, the CPU 314 sets the flag indicating the IAFD mode of the FAX apparatus 301 to OFF and stores it in the RAM 312. Subsequently, in step S905, the CPU 314 reads out an ECM value 507 of FAX reception setting 503 stored in the RAM 312, and determines whether ECM is ON. If ECM is ON, the process advances to step S903, and the CPU 314 decides that the value of ECM to be used for capability exchange is ON. If the value is OFF, the process advances to step S906, and the CPU 314 decides that the value of ECM to be used for capability exchange is OFF.

When the value of ECM to be used for capability exchange is decided, the process advances to step S907. The CPU 314 sets the value of Bit 27 of a DIS in accordance with the decided ECM value and transmits the DIS. In step S908, the CPU 314 receives a DCS and acquires the value of Bit 27 representing the ECM mode and the value of Bit 123 representing the IAFD mode from the value of control signal information.

In step S909, the CPU 314 reads out the value of the IAFD mode of the FAX apparatus 301 stored in the RAM 312, and determines whether both the value of the IAFD mode of the FAX apparatus 301 and the value of the IAFD mode of the DCS acquired in step S908 are ON. If both values are ON, the process advances to step S912, and the CPU 314 transmits a CFR. After that, the process transits to the image reception phase in step S913. If at least one of the values is OFF, the process advances to step S910, and the CPU 314 determines whether the ECM mode of the DCS is ON. If ECM is ON, the process advances to step S912, and the CPU 314 transmits a CFR. The process then transits to the image reception phase in step S913. If ECM is OFF, the process advances to step S911. The CPU 314 updates the flag indicating the IAFD mode of the FAX apparatus 301 to OFF and stores it in the RAM 312. In addition, the CPU 314 retransmits a DIS in which the IAFD mode is set to OFF, that is, Bit 123 is set to 0. In this case, the transmission end apparatus re-receives the DIS. After the retransmission, the process returns to step S908 to perform DCS reception processing.

Figure 4:
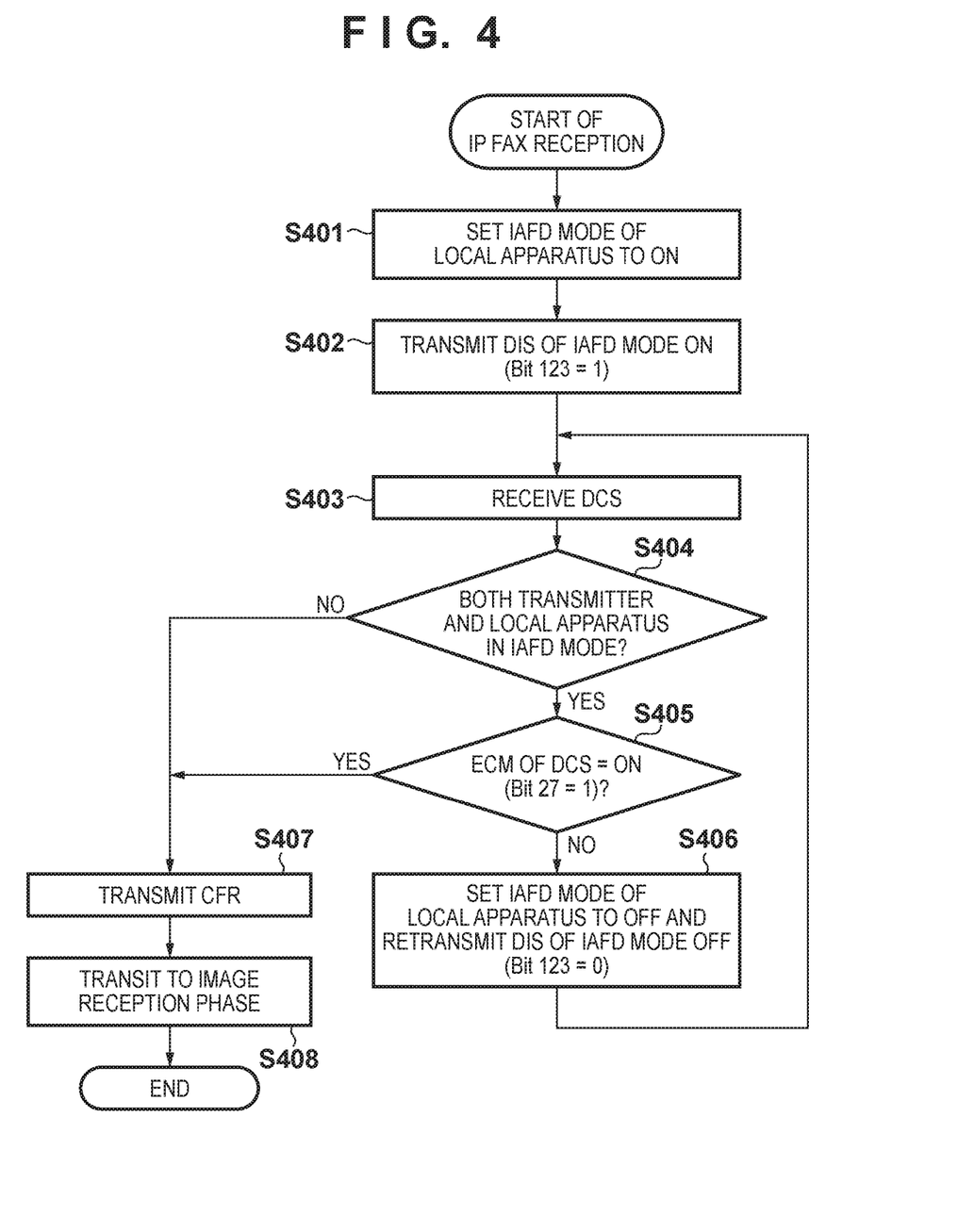
FIG. 4 is a flowchart showing a processing procedure according to the first embodiment.

As in FIG. 4, once the IAFD mode of the FAX apparatus 301 is set to OFF in step S911, the determination of step S909 always ends with NO from the second time. Hence, the processing of changing the IAFD mode to OFF and retransmitting the DIS is performed only once. That is, an endless loop is not formed even if the DIS of IAFD mode OFF is transmitted in step S911, and nonetheless, the partner apparatus transmits the DCS of IAFD mode ON again.

With the above-described processing, even when the reception ECM 507 of the apparatus is set to OFF, the apparatus can always operate by setting ECM to ON at the time of IP FAX reception. This can prevent Non-ECM communication that may suffer a communication error caused by a late MCF response from being performed due to the ECM setting on the receiver side at the time of IP FAX reception. In addition, even when the transmitter declares the IAFD mode and Non-ECM, the transmission speed of the transmitter can be lowered from the NW speed to the analog G3 speed by retransmitting the DIS of IAFD mode OFF on the receiver side. For this reason, the receiver can reliably return the MCF response within the prescribed time.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A facsimile apparatus which is able to perform IP facsimile communication and G3 facsimile communication, comprising:
    a memory configured to store a setting whether to perform facsimile communication in an error correction mode or to perform facsimile communication in a non-error correction mode; and
    a controller configured to control performing IP facsimile communication in the error correction mode even if the setting is a setting to perform facsimile communication in the non-error correction mode,
    wherein the controller controls performing G3 facsimile communication in the error correction mode based on the setting to perform facsimile communication in the error correction mode, and to control performing G3 facsimile communication in the non-error correction mode based on the setting to perform facsimile communication in the non-error correction mode.

2. The apparatus according to claim 1, further comprising a storage configured to store an address book in which a plurality of addresses are registered,
    wherein the setting is stored in the memory for each of the plurality of addresses.

3. The apparatus according to claim 2, wherein the controller controls performing G3 facsimile communication in the error correction mode in a case where the apparatus performs the G3 facsimile communication with an address included in the address book and the setting stored for the address is the setting to perform facsimile communication in the error correction mode.

4. The apparatus according to claim 1, wherein the error correction mode is a mode for requesting retransmission of data which has failed in reception.

5. The apparatus according to claim 1, wherein the setting is a setting for both the IP facsimile communication and the G3 facsimile communication.

6. A control method of a facsimile apparatus which is able to perform IP facsimile communication and G3 facsimile communication and which comprises a memory configured to store a setting whether to perform facsimile communication in an error correction mode or to perform facsimile communication in a non-error correction mode, the control method comprising:
    performing IP facsimile communication in the error correction mode even if the setting is a setting to perform facsimile communication in the non-error correction mode; and
    performing G3 facsimile communication in the error correction mode based on the setting to perform facsimile communication in the error correction mode, and performing G3 facsimile communication in the non-error correction mode based on the setting to perform facsimile communication in the non-error correction mode.

7. A non-transitory computer-readable storage medium storing a computer program that causes a computer to execute each step of a control method of a facsimile apparatus which is able to perform IP facsimile communication and G3 facsimile communication and which comprises a memory configured to store a setting whether to perform facsimile communication in an error correction mode or to perform facsimile communication in a non-error correction mode, the control method comprising:
    performing IP facsimile communication in the error correction mode, even if the setting is a setting to perform facsimile communication in the non-error correction mode; and
    performing G3 facsimile communication in the error correction mode based on the setting to perform facsimile communication in the error correction mode, and perform G3 facsimile communication in the non-error correction mode based on the setting to perform facsimile communication in the non-error correction mode.

* * * * *